H. KOCOUREK.
ANIMAL SHEARS.
APPLICATION FILED MAY 14, 1920.
1,411,440.   Patented Apr. 4, 1922.
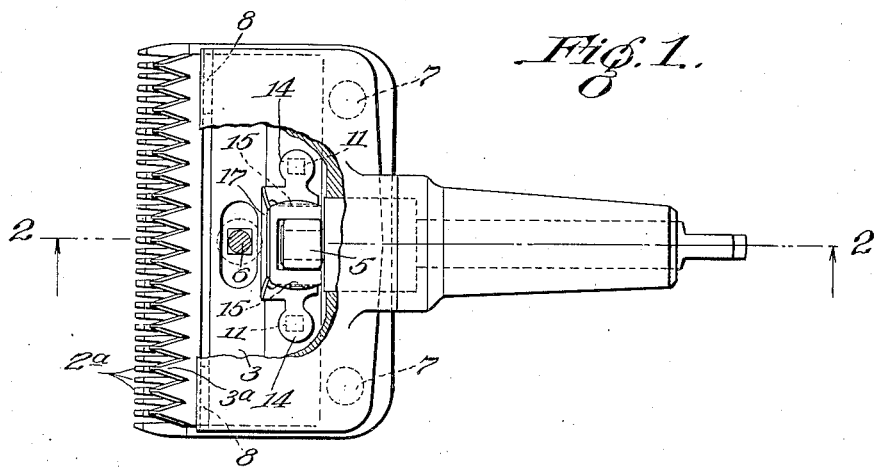
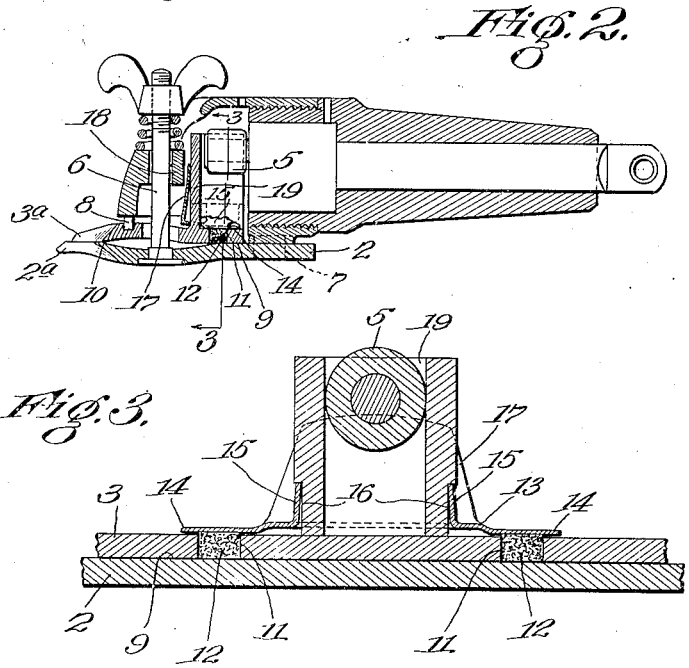
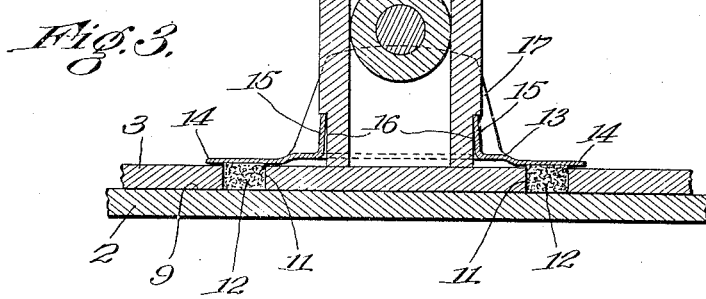
WITNESSES:
INVENTOR
Henry Kocourek
BY Burton & Burton
HIS ATTORNEYS

UNITED STATES PATENT OFFICE.

HENRY KOCOUREK, OF CHICAGO, ILLINOIS, ASSIGNOR, BY DIRECT AND MESNE ASSIGNMENTS, TO CHICAGO FLEXIBLE SHAFT COMPANY, OF CHICAGO, ILLINOIS, A CORPORATION OF ILLINOIS.

ANIMAL SHEARS.

1,411,440.   Specification of Letters Patent.   Patented Apr. 4, 1922.

Application filed May 14, 1920. Serial No. 381,334.

*To all whom it may concern:*

Be it known that I, HENRY KOCOUREK, a citizen of the United States, residing in the city of Chicago, county of Cook, and State of Illinois, have invented certain new and useful Improvements in Animal Shears, of which the following is a specification, reference being had to the accompanying drawings, forming a part thereof.

This invention relates to animal shears of the type known as horse clippers and consists of improved means of lubricating the co-acting surfaces of the shearing members, to reduce their wear. These improvements involve the features of construction described and shown in the drawings as indicated by the claims.

In the drawings:

Figure 1 is a plan view of a clipper head embodying this invention with parts broken away to disclose certain features of construction.

Figure 2 is an axial section taken as indicated at the line, 2—2, on Figure 1.

Figure 3 is a section transaxial with respect to the driving shaft, taken at the line, 3—3, on Figure 2.

The type of clipper with which this invention is concerned consists of a frame member, 1, provided with means for mounting a comb, 2, relatively stationary therewith, and a cutter, 3, mounted for oscillation interposed between the frame and the comb. A cross-head, 4, attached to or integral with the cutter is provided thereon for engaging a crank-roller, 5, for imparting the necessary motion thereto, causing the cutter to travel over the comb with which it contacts.

A spring-tensioned bolt, 6, acts to hold the shearing elements, 2 and 3, together, and also against the bosses, 7, 7, and the guide ribs, 8, 8, on the frame, 1.

The structure and operation so far described is of familiar type, and it will be noticed that the shearing elements contact each other at two lines, i. e., at the line along the teeth and at a line along the heel of the cutter, 3, at 9.

In the process of manufacture for certain reasons, the shearing elements are so tempered that they offer more resistance to wear at the teeth than at the line, 9, where the heel of the cutter contacts the comb, and without provision to the contrary and with ordinary use, the points, $2^a$ and $3^a$, of the teeth of the comb and cutter respectively, would become separated, diverging from the point, 10, (see Figure 2), or approximately at the root of the teeth, about which the two shearing elements would rock, with the result that the implement would become snagged and fail to operate properly for cutting or shearing.

A simple solution of the difficulty would seem to be to introduce a lubricant between the members, but the occasional application of a quantity so restricted as not to undesirably flood the implement would not give an adequate supply for avoiding undue wear; so to meet this difficulty there is provided means for storing lubricant in two small pockets, 11, 11, formed in one of the elements, preferably the cutter; each of the pockets contains a wick 12, of some absorbent material such as cotton. The pockets are open at the bottom so that the wicks may contact the comb for conveying the lubricant thereto. For the purpose of holding the wicks, 12, in position, there is provided a retaining device, 13, made of some suitable material such as spring metal formed with the lateral extensions, 14, 14, overlying the oil pockets and held down by the up-standing clips, 15, 15, which engage in grooves, 16, 16, formed in the side of the cross-head, 4. To hold the device, 13, from displacement when assembled there is an up-turned flange, 17, bent at an angle somewhat less than 90 degrees extending upward to a position between the hollow boss, 18, on the main frame member, 1, through which the bolt, 6, protrudes and the adjacent wall, 19, of the cross-head, against which the said flange, 17, is sprung, causing the clips, 15, to cramp in the grooves, 16, 16, and this securement, supplemented by the boss, 18, will effectively hold the device in position. It is evident that other specific means than those described in the foregoing, could be employed for feeding the lubricant to prevent the abrading of the elements; for example, graphite pencils of proper dimensions may be substituted for the oil-saturated wicks, and held in contact by the lateral extensions, 14.

I claim:—

1. In a clipper comprising a frame, a comb mounted rigidly thereon, a cutter contiguous to said comb arranged to be driven by a crank-roller through a cross-head integral with said cutter; a lubricator-holding device having clips for engaging the cross-head; lubricant-containing pockets in the cutter and members extending laterally from the lubricator-holding device overlying the said lubricant-containing pockets.

2. In a clipper comprising a frame, a comb mounted rigidly thereon, a cutter contiguous to the comb arranged to be driven by a crank-roller through a cross-head integral with the said cutter; grooves in the said cross-head; a lubricator-holding device having clips for engaging said grooves and a spring flange on said device for cramping said clips in said grooves.

3. In a clipper comprising a frame, a comb mounted rigidly thereon, a cutter contiguous to said comb arranged to be driven by a crank-roller through a cross-head integral with said cutter; lubricant-containing pockets in the cutter; a lubricator-holding device having lateral extensions for overlying the said lubricant-containing pockets; grooves in said cross-head, upstanding clips on said device for engaging the said grooves, and a spring flange engaging the cross-head for cramping the said clips in the said grooves.

4. In a clipper comprising a frame, a comb mounted rigidly thereon; a cutter contiguous to said comb arranged to be driven by a crank-roller through a cross-head integral with said cutter, a boss on said frame, a lubricator-holding device, an up-standing flange thereon for holding the said device in position by engaging the said boss.

In testimony whereof, I have hereunto set my hand at Chicago, Illinois, this 27th day of April, 1920.

HENRY KOCOUREK.